United States Patent
Bradbury et al.

(10) Patent No.: US 10,168,902 B2
(45) Date of Patent: Jan. 1, 2019

(54) REDUCING PURGING OF STRUCTURES ASSOCIATED WITH ADDRESS TRANSLATION

(71) Applicant: INTERNATIONAL BUSINESS MACHINES CORPORATION, Armonk, NY (US)

(72) Inventors: Jonathan D. Bradbury, Poughkeepsie, NY (US); Lisa Cranton Heller, Rhinebeck, NY (US); Christian Jacobi, Poughkeepsie, NY (US); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/212,396

(22) Filed: Jul. 18, 2016

(65) Prior Publication Data
US 2018/0018093 A1 Jan. 18, 2018

(51) Int. Cl.
| G06F 12/00 | (2006.01) |
| G06F 13/00 | (2006.01) |
| G06F 3/06 | (2006.01) |
| G06F 12/1027 | (2016.01) |
| G06F 12/1009 | (2016.01) |

(52) U.S. Cl.
CPC ............. *G06F 3/0604* (2013.01); *G06F 3/061* (2013.01); *G06F 3/0652* (2013.01); *G06F 3/0653* (2013.01); *G06F 3/0664* (2013.01); *G06F 3/0673* (2013.01); *G06F 12/1009* (2013.01); *G06F 12/1027* (2013.01);
(Continued)

(58) Field of Classification Search
CPC ............. G06F 12/1027; G06F 2212/68; G06F 2212/681; G06F 2212/684
USPC .................................................. 711/202, 207
See application file for complete search history.

(56) References Cited

U.S. PATENT DOCUMENTS

| 4,068,303 A | 1/1978 | Morita |
| 4,456,954 A | 7/1984 | Bullions, III et al. |

(Continued)

FOREIGN PATENT DOCUMENTS

| EP | 000067344 A2 | 12/1982 |
| EP | 0145960 A2 | 6/1985 |

(Continued)

OTHER PUBLICATIONS

Alkassar, Eyad, et al., "Automated Verification of a Small Hypervisor," Third International Conference, VSTTE 2010, Edinburgh, UK, Aug. 2010. pp. 41-54.
(Continued)

*Primary Examiner* — Sean D Rossiter
(74) *Attorney, Agent, or Firm* — Steven Chiu, Esq.; Blanche E. Schiller, Esq.; Heslin Rothenberg Farley & Mesiti P.C.

(57) ABSTRACT

Selective purging of a structure associated with address translation, such as a translation look-aside buffer. When purging of entries of a structure relating to a virtual processor executing on a physical processor is requested, it is determined whether the physical processor may refrain from such purging. A check is made as to whether purging has previously been performed on this physical processor for this virtual processor, and if so, the physical processor may refrain from purging.

20 Claims, 14 Drawing Sheets

(52) U.S. Cl.
CPC .............. *G06F 2212/1016* (2013.01); *G06F 2212/151* (2013.01); *G06F 2212/683* (2013.01)

(56) References Cited

U.S. PATENT DOCUMENTS

| | | | |
|---|---|---|---|
| 4,525,778 A | 6/1985 | Cane | |
| 4,733,350 A | 3/1988 | Tone | |
| 4,779,188 A | 10/1988 | Gum et al. | |
| 4,821,171 A | 4/1989 | Calamari | |
| 5,073,851 A | 12/1991 | Masterson | |
| 5,317,705 A | 5/1994 | Gannon et al. | |
| 5,317,754 A | 5/1994 | Blandy | |
| 5,428,757 A | 6/1995 | Sutton | |
| 5,491,806 A | 2/1996 | Horstmann et al. | |
| 5,574,878 A | 11/1996 | Onodera | |
| 5,896,520 A | 4/1999 | Ohminato et al. | |
| 5,940,872 A | 8/1999 | Hammond et al. | |
| 5,978,892 A | 11/1999 | Noel | |
| 6,079,013 A | 6/2000 | Webb | |
| 6,263,403 B1 | 7/2001 | Traynor | |
| 6,332,163 B1 | 12/2001 | Bowman-Amuah | |
| 6,430,667 B1* | 8/2002 | Loen | G06F 12/109 711/153 |
| 6,604,187 B1 | 8/2003 | McGrath et al. | |
| 6,631,447 B1 | 10/2003 | Morioka | |
| 6,961,806 B1 | 11/2005 | Agesen | |
| 7,114,054 B2* | 9/2006 | Greer | G06F 5/10 711/128 |
| 7,117,338 B2 | 10/2006 | Brewer | |
| 7,197,585 B2 | 3/2007 | Farrell et al. | |
| 7,284,100 B2 | 10/2007 | Slegel et al. | |
| 7,296,139 B1* | 11/2007 | Case | G06F 12/0897 710/26 |
| 7,296,265 B1 | 11/2007 | Krishnan et al. | |
| 7,299,337 B2 | 11/2007 | Traut et al. | |
| 7,334,108 B1* | 2/2008 | Case | G06F 12/1045 710/26 |
| 7,363,463 B2 | 4/2008 | Sheu et al. | |
| 7,376,949 B2 | 5/2008 | Lowell et al. | |
| 7,409,487 B1* | 8/2008 | Chen | G06F 12/1036 711/209 |
| 7,454,590 B2 | 11/2008 | Jordan et al. | |
| 7,509,475 B2 | 3/2009 | Shinohara et al. | |
| 7,543,291 B2 | 6/2009 | Lesartr et al. | |
| 7,562,179 B2 | 7/2009 | Brandt et al. | |
| 7,624,240 B1 | 11/2009 | Colbert | |
| 7,636,831 B1 | 12/2009 | Subrahmanyam | |
| 7,650,482 B2 | 1/2010 | Traut et al. | |
| 7,657,659 B1 | 2/2010 | Lambeth | |
| 7,661,102 B2 | 2/2010 | Ogle | |
| 7,734,892 B1 | 6/2010 | Rozas et al. | |
| 7,814,287 B2 | 10/2010 | Pratt | |
| 7,836,275 B2 | 11/2010 | Anderson et al. | |
| 7,865,670 B2 | 1/2011 | Cota-Robles et al. | |
| 7,941,799 B2 | 5/2011 | Easton et al. | |
| 8,015,388 B1 | 9/2011 | Rihan et al. | |
| 8,032,716 B2* | 10/2011 | Heller | G06F 12/1027 711/141 |
| 8,095,771 B2 | 1/2012 | Sheu et al. | |
| 8,127,098 B1 | 2/2012 | Klaiber et al. | |
| 8,151,085 B2 | 4/2012 | Deutschle et al. | |
| 8,166,239 B2 | 4/2012 | Fertig et al. | |
| 8,301,863 B2* | 10/2012 | Hall | G06F 12/109 711/202 |
| 8,307,191 B1 | 11/2012 | Jain | |
| 8,380,907 B2 | 2/2013 | Heller et al. | |
| 8,387,049 B2 | 2/2013 | Adlung et al. | |
| 8,397,050 B2 | 3/2013 | Chang et al. | |
| 8,438,363 B1 | 5/2013 | Koryakin et al. | |
| 8,452,942 B2 | 5/2013 | Siegel et al. | |
| 8,490,085 B2 | 7/2013 | Devaux | |
| 8,738,932 B2 | 5/2014 | Lee et al. | |
| 8,745,356 B2 | 6/2014 | Maruyama | |
| 8,930,635 B2 | 1/2015 | Woffinden | |
| 8,954,709 B2 | 2/2015 | Nishiguchi et al. | |
| 9,069,715 B2* | 6/2015 | Deutschle | G06F 12/16 |
| 9,075,721 B2 | 7/2015 | Tamura | |
| 9,081,707 B2 | 7/2015 | Conrad et al. | |
| 9,086,989 B2 | 7/2015 | Gupta et al. | |
| 9,092,382 B2 | 7/2015 | Deutschle et al. | |
| 9,182,984 B2 | 11/2015 | Greiner et al. | |
| 9,330,018 B2* | 5/2016 | Deutschle | G06F 12/1027 |
| 9,697,135 B2* | 7/2017 | Deutschle | G06F 12/1009 |
| 9,798,597 B1 | 10/2017 | Duale et al. | |
| 9,858,198 B2 | 1/2018 | Seiler | |
| 2004/0064618 A1 | 4/2004 | Farrell et al. | |
| 2004/0117593 A1 | 6/2004 | Uhlig et al. | |
| 2004/0225765 A1* | 11/2004 | Greer | G06F 5/10 710/52 |
| 2006/0259734 A1* | 11/2006 | Sheu | G06F 12/1036 711/203 |
| 2006/0294288 A1 | 12/2006 | Seth | |
| 2007/0016904 A1 | 1/2007 | Adlung et al. | |
| 2007/0050594 A1 | 3/2007 | Augsburg | |
| 2007/0112999 A1 | 5/2007 | Oney | |
| 2008/0016315 A1 | 1/2008 | Cohen | |
| 2008/0133875 A1 | 6/2008 | Cohen | |
| 2008/0155168 A1 | 6/2008 | Sheu | |
| 2008/0201540 A1 | 8/2008 | Sahita et al. | |
| 2008/0320216 A1 | 12/2008 | Fertig et al. | |
| 2009/0013149 A1 | 1/2009 | Uhlig et al. | |
| 2009/0158004 A1 | 6/2009 | Hasegaw et al. | |
| 2009/0216928 A1* | 8/2009 | Heller | G06F 12/1027 710/260 |
| 2009/0216984 A1 | 8/2009 | Gainey et al. | |
| 2010/0074146 A1* | 3/2010 | Banks | H04L 1/1867 370/254 |
| 2010/0250895 A1 | 9/2010 | Adams | |
| 2010/0274987 A1 | 10/2010 | Subrahmanyam et al. | |
| 2011/0082962 A1 | 4/2011 | Horovitz et al. | |
| 2011/0320755 A1* | 12/2011 | Blake | G06F 12/0292 711/170 |
| 2012/0017039 A1 | 1/2012 | Margetts | |
| 2012/0246387 A1 | 9/2012 | Kanno | |
| 2012/0331266 A1 | 12/2012 | Anraku | |
| 2013/0042066 A1* | 2/2013 | Price | G06F 12/0866 711/119 |
| 2013/0246605 A1* | 9/2013 | Mahadik | H04L 63/1433 709/224 |
| 2013/0339655 A1 | 12/2013 | Hom et al. | |
| 2013/0339656 A1 | 12/2013 | Greiner et al. | |
| 2013/0339657 A1 | 12/2013 | Greiner et al. | |
| 2014/0047456 A1 | 2/2014 | Haba | |
| 2014/0095840 A1 | 4/2014 | Heller | |
| 2014/0101401 A1 | 4/2014 | Mulcahy et al. | |
| 2014/0129798 A1 | 5/2014 | Deutschle et al. | |
| 2014/0129800 A1 | 5/2014 | Deutschle et al. | |
| 2014/0230077 A1 | 8/2014 | Muff et al. | |
| 2014/0325167 A1 | 10/2014 | Siegel et al. | |
| 2014/0331224 A1 | 11/2014 | Robenko et al. | |
| 2015/0058522 A1 | 2/2015 | Armstrong et al. | |
| 2015/0089116 A1 | 3/2015 | Chin et al. | |
| 2015/0100748 A1 | 4/2015 | Farrell et al. | |
| 2015/0106599 A1 | 4/2015 | Gainey, Jr. et al. | |
| 2015/0120985 A1 | 4/2015 | Frey et al. | |
| 2015/0149997 A1 | 5/2015 | Tsirkin et al. | |
| 2015/0151056 A1 | 6/2015 | Deguillard et al. | |
| 2015/0161056 A1 | 6/2015 | DeGuillard et al. | |
| 2015/0242227 A1* | 8/2015 | Nair, Sr. | G06F 21/60 718/1 |
| 2015/0269085 A1 | 9/2015 | Gainey | |
| 2015/0331802 A1* | 11/2015 | Cain, III | G06F 12/0862 711/136 |
| 2015/0370592 A1 | 12/2015 | Tuch et al. | |
| 2016/0292082 A1 | 10/2016 | Craddock et al. | |
| 2017/0003964 A1 | 1/2017 | Bartik et al. | |
| 2017/0024326 A1 | 1/2017 | Luo | |
| 2017/0123996 A1 | 5/2017 | Kishan | |
| 2017/0249261 A1 | 8/2017 | Durham | |
| 2017/0371695 A1 | 12/2017 | Sanjeepan | |
| 2018/0018190 A1 | 1/2018 | Heller et al. | |
| 2018/0018274 A1 | 1/2018 | Bradbury et al. | |
| 2018/0018275 A1 | 1/2018 | Bradbury et al. | |

(56) References Cited

U.S. PATENT DOCUMENTS

| | | |
|---|---|---|
| 2018/0018276 A1 | 1/2018 | Bradbury et al. |
| 2018/0018277 A1 | 1/2018 | Bradbury et al. |
| 2018/0018278 A1 | 1/2018 | Bradbury et al. |
| 2018/0018279 A1 | 1/2018 | Bradbury et al. |
| 2018/0018280 A1 | 1/2018 | Bradbury et al. |
| 2018/0018281 A1 | 1/2018 | Bradbury et al. |
| 2018/0018282 A1 | 1/2018 | Bradbury et al. |
| 2018/0018283 A1 | 1/2018 | Borntraeger et al. |
| 2018/0018284 A1 | 1/2018 | Borntraeger et al. |
| 2018/0067868 A1 | 3/2018 | Bradbury et al. |

FOREIGN PATENT DOCUMENTS

| | | |
|---|---|---|
| EP | 002248025 B1 | 3/2012 |
| EP | 2862059 | 4/2015 |
| JP | S61156445 A | 7/1986 |
| JP | 4769308 | 9/2011 |
| KR | 101287448 B1 | 7/2013 |
| TW | 201413454 | 4/2014 |
| WO | WO2006039057 A3 | 4/2006 |
| WO | WO2013101378 A1 | 7/2013 |
| WO | WO2014036004 A1 | 3/2014 |
| WO | WO2015009318 A1 | 1/2015 |
| WO | WO2015145620 A1 | 1/2015 |

OTHER PUBLICATIONS

Arya, K., et al., "Tesseract: Reconciling Guest I/O and Hypervisor Swapping in a VM," ACM SIGPLAN Notices, 49(7), Mar. 2014, pp. 15-28.
Axnix, C. et al., "IBM z13 Firmware Innovations for Simultaneous Multithreading and I/O Virtualization," IBM Journal of Research and Development, vol. 59, No. 4/5, Paper 11, Jul./Sep. 2015, pp. 11:1-11:11.
Caraman, Mihai, "Patchwork KVM: PPC: e500mc: Relax TLB Invalidation Condition on VCPU Schedule," Jun. 2014, pp. 1-9.
Coscarella, et al., "System for Purging TLB," IP.com No. 000052724, Feb. 2005, pp. 1-2 (+cover).
Frey, B.G., & Mueller, M.J., "Translation Lookaside Buffer Castout Queue," IP.com No. IPCOM000120766D, Apr. 2, 2005, pp. 106-107 (+cover).
IBM, "Power ISA V2.07B", Apr. 9, 2015, pp. 1-1527.
IBM, "System /370 Extended Architecture/Interpretive Execution," IBM Publication No. SA22-7095-01, Sep. 1985, pp. 1-32.
IBM, "z/Architecture—Principles of Operation," IBM Publication No. SA22-7832-10, 11th Edition, Mar. 2015, pp. 1-1732.
IBM, "z/VM: Running Guest Operating Systems," IBM® Publication No. SC24-5997-02, Oct. 2001, pp. 1-179.
IPCOM000128917, IBM, "IBM System/370 Systems Principles of Operation," IP.com No. 000128917, pp. 1-356 (+cover).
IPCOM000146587D, Anonymous, "An Efficient TLB Virtualization Algorithm Using Machine Contiguous Page Information in a Virtualization Environment," Feb. 16, 2017, pp. 1-4.
IPCOM000192722D, Mihm, Thomas, Jr., et al., "Four Reasons Your Next Mobile Product Should have a Hypervisor," Feb. 2010, pp. 1-8.
IPCOM000222815D, Anonymous, "Multi-Level Nested Translation Lookaside Buffers," Oct. 23, 2012, p. 1 (+cover).
Kerrigan, et al., "Table Lookaside Buffer with Selective Space Invalidation," IP.com No. 000087098, Mar. 2005, p. 1 (+cover).
Mel, Peter and Tim Grance, "The NIST Definition of Cloud Computing," National Institute of Standards and Technology, Information Technology Laboratory, Special Publication 800-145, Sep. 2011, pp. 1-7.
Nordholz, Jan et al., "XNPro: Low-Impact Hypervisor-Based Execution Prevention on ARM," TrustED, Oct. 2015, pp. 55-64.
Osisek, et al., "ESA/390 interpretive-execution architecture, foundation for VM/ESA," IBM Systems Journal, vol. 30, No. 1, Jan. 1991, pp. 34-51.
Samanta, et al., "Dynamic Aggregation of Virtual Addresses in TLB using TCAM Cells," 21st International Conference on VLSI Design, Jan. 2008, pp. 243-248.
Schwarz, et al., "The Microarchitecture of the IBM eServer z900 Processor," IBM Journal of Research and Development 46, No. 4, Jul. 2002, pp. 381-395.
Sobania, Jan-Arne et al., "Towards Symmetric Multi-Processing Support for Operating Systems on the SCC," 4th Marc Symposium, Dec. 2011, pp. 73-78.
Vahidi, A. et al., "VETE: Virtualizing the Trusted Execution Environment," SICS Technical Report T2013:02, Mar. 2013, pp. 1-35.
Venkatasubramanian, et al., "TMT—A TLB Tag Management Framework for Virtualized Platforms," 21st Annual Symposium on Computer Architecture and High Performance Computing, Oct. 2009, pp. 153-160.
Whang, Z., et al., "Hypersafe: A Lightweight Approach to Provide Lifetime Hypervisor Control-Flow Integrity," 2010 IEEE Symposium on Security and Privacy, May 2010, pp. 380-395.
Yu, Cong et al., "Protecting the Security and Privacy of the Virtual Machine through Privilege Separation," Proceedings of the 2nd International Conference on Computer Science and Electronics Engineering, 2013 (no further date information available) pp. 2224-2228.
Bradbury, et al., "Host Page Management Using Active Guest Page Table Indicators," U.S. Appl. No. 15/212,492, filed Jul. 18, 2016 (108 pages).
Bradbury, et al., "Host-Based Resetting of Active Use of Guest Page Table Indicators," U.S. Appl. No. 15/212,477, filed Jul. 18, 2016 (79 pages).
Bradbury, et al., "Marking Storage Keys to Indicate Memory Used to Back Address Translation Structures," U.S. Appl. No. 15/212,462, filed Jul. 18, 2016 (71 pages).
Bradbury, et al., "Reducing Over-Purging of Structures Associated with Address Translation Using an Array of Tags," U.S. Appl. No. 15/212,436, filed Jul. 18, 2016 (88 pages).
Bradbury, et al., "Managing Memory Used to Back Address Translation Structures," U.S. Appl. No. 15/212,409, filed Jul. 18, 2016 (72 pages).
Bradbury, et al., "Reducing Over-Purging of Structures Associated with Address Translation," U.S. Appl. No. 15/212,347, filed Jul. 18, 2016 (83 pages).
Bradbury, et al., "Marking Page Table/Page Status Table Entries to Indicate Memory Used to Back Address Translation Structures," U.S. Appl. No. 15/212,379, filed Jul. 18, 2016 (71 pages).
Bradbury, et al., "Marking to Indicate Memory Used to Back Address Translation Structures," U.S. Appl. No. 15/212,524, filed Jul. 18, 2016 (69 pages).
Borntraeger, et al., "Selective Purging of Guest Entries of Structures Associated with Address Translation," U.S. Appl. No. 15/212,503, filed Jul. 18, 2016 (56 pages).
Heller, et al., "Delaying Purging of Structures Associated with Address Translation," U.S. Appl. No. 15/212,360, filed Jul. 18, 2016 (66 pages).
Bradbury, et al., "Increasing the Scope of Local Purges of Structures Associated with Address Translation," U.S. Appl. No. 15/212,546, filed Jul. 18, 2016 (69 pages).
Borntraeger, et al., "Selective Purging of Entries of Structures Associated with Address Translation in a Virtualized Environment," U.S. Appl. No. 15/212,570, filed Jul. 18, 2016 (57 pages).
List of IBM Patents or Patent Applications Treated as Related, Nov. 21, 2016, pp. 1-2.
IBM, "PJ40387: Provide Local IPTE Support," Oct. 2012, http://www-01.ibm.com/support/docview.wss?uid=swg1PJ40387, pp. 1-7.
Brown et al., Fundamentals of Digital Logic with Verilog Design, Jul. 2002, pp. 367-368 (+ cover).
IBM, "z/Architecture—Principles of Operation," SA22-7832-10, Eleventh Edition, Mar. 2015, pp. 10-36 thru 10-39 (+ cover).

* cited by examiner

REDUCING PURGING OF STRUCTURES ASSOCIATED WITH ADDRESS TRANSLATION

BACKGROUND

One or more aspects relate, in general, to processing within a computing environment, and in particular, to processing associated with address translation data structures of a virtual environment.

In computing environments that support virtualization technology, dynamic address translation (DAT) may be performed during a memory reference to translate a virtual address into a corresponding real or absolute address. This translation typically includes a walk, referred to as a page or DAT walk, of multiple levels of address translation tables in order to determine the real address. This is time consuming, and thus, to improve performance for future translation requests, the virtual address to real or absolute address mapping is stored in an entry of a structure associated with address translation, such as a translation look-aside buffer (TLB) or other such structure.

The translation look-aside buffer is a cache used by the memory management hardware to improve virtual address translation speed. The next time translation for a virtual address is requested, the TLB is checked. If the translation is in the TLB, there is a TLB hit and the real or absolute address is retrieved from the TLB. Otherwise, the DAT walk is performed once again.

At times, it is necessary to purge some or all of the TLB entries used by a particular processor. When this occurs, it is expensive in terms of performance to perform address translation.

SUMMARY

Shortcomings of the prior art are overcome and additional advantages are provided through the provision of a computer program product for managing purging of structures associated with address translation. The computer program product includes a storage medium readable by a processing circuit and storing instructions for execution by the processing circuit for performing a method. The method includes, for instance, obtaining a tracking structure for a virtual processor executing on a current physical processor, the tracking structure tracking which physical processors of a plurality of physical processors are to perform a purging operation for this virtual processor on a structure associated with address translation; and selectively performing, by the current physical processor on which the virtual processor is executing, the purging operation on the structure associated with address translation, the selectively performing being based on the tracking structure, wherein the selectively performing refrains from performing the purging operation based on the tracking structure indicating the purging operation is not to be performed. This aspect reduces the need to perform the purging operation in certain circumstances, and therefore, may increase system performance.

In one embodiment, the structure associated with address translation is a translation look-aside buffer.

At least one of the obtaining and the selectively performing is performed based on dispatching the virtual processor on the current physical processor.

As an example, the tracking structure includes a bitmask. The bitmask includes a plurality of indicators for the plurality of physical processors, in which an indicator in the bitmask for the current physical processor that is set to a particular value indicates the current physical processor is to refrain from performing the purging operation for the virtual processor. In one example, an address of the current physical processor is used to index into the bitmask. The use of a bitmask facilitates tracking.

In a further example, the tracking structure includes a bitmask, and the bitmask includes indicators for a subset of physical processors of the plurality of physical processors. The bitmask is indexed into using a portion of an address of the current physical processor on which the virtual processor is executing to determine whether the current physical processor is to perform the purging operation for the virtual processor. This example of the bitmask only needs to include indicators for a subset of the processors enabling use of a smaller bitmask.

In one embodiment, one portion of an address of the current physical processor on which the virtual processor is executing is compared with one portion of an address of a previous physical processor on which the virtual processor was dispatched. Further, another portion of the address of the current physical processor and another portion of the address of the previous physical processor are not included in the comparing. Moreover, the selectively performing the purging operation is performed based on the comparing.

In yet another example, the tracking structure includes a bitmask having indicators for a subset of physical processors of the plurality of physical processors, and the selectively performing the purging operation includes: using, based on the comparing indicating a match, the other portion of the address of the current physical processor to index into the bitmask to determine whether the purging operation is to be performed by the current physical processor; and refraining from performing the purging operation of the structure associated with address translation, based on the bitmask indicating purging is not to be performed on the current physical processor.

As one example, the purging operation is performed on the current physical processor, based on the bitmask indicating the purging operation is to be performed. Based on performing the purging operation, the indicator in the bitmask for the current physical processor is set to indicate purging is not to be performed.

In one example, based on performing the purging operation, other indicators of the bitmask are set to indicate purging is to be performed.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a selective purging capability is provided that reduces the need to purge selected structures associated with address translation in certain situations. For instance, purging may be avoided when a virtual processor is moved from one physical processor to another physical processor. In the examples herein, the structure associated with address translation is a translation look-aside buffer (TLB). However, this is only one example, and one or more aspects may apply to other types of structures associated with address translation that undergo purging.

Figure 1:
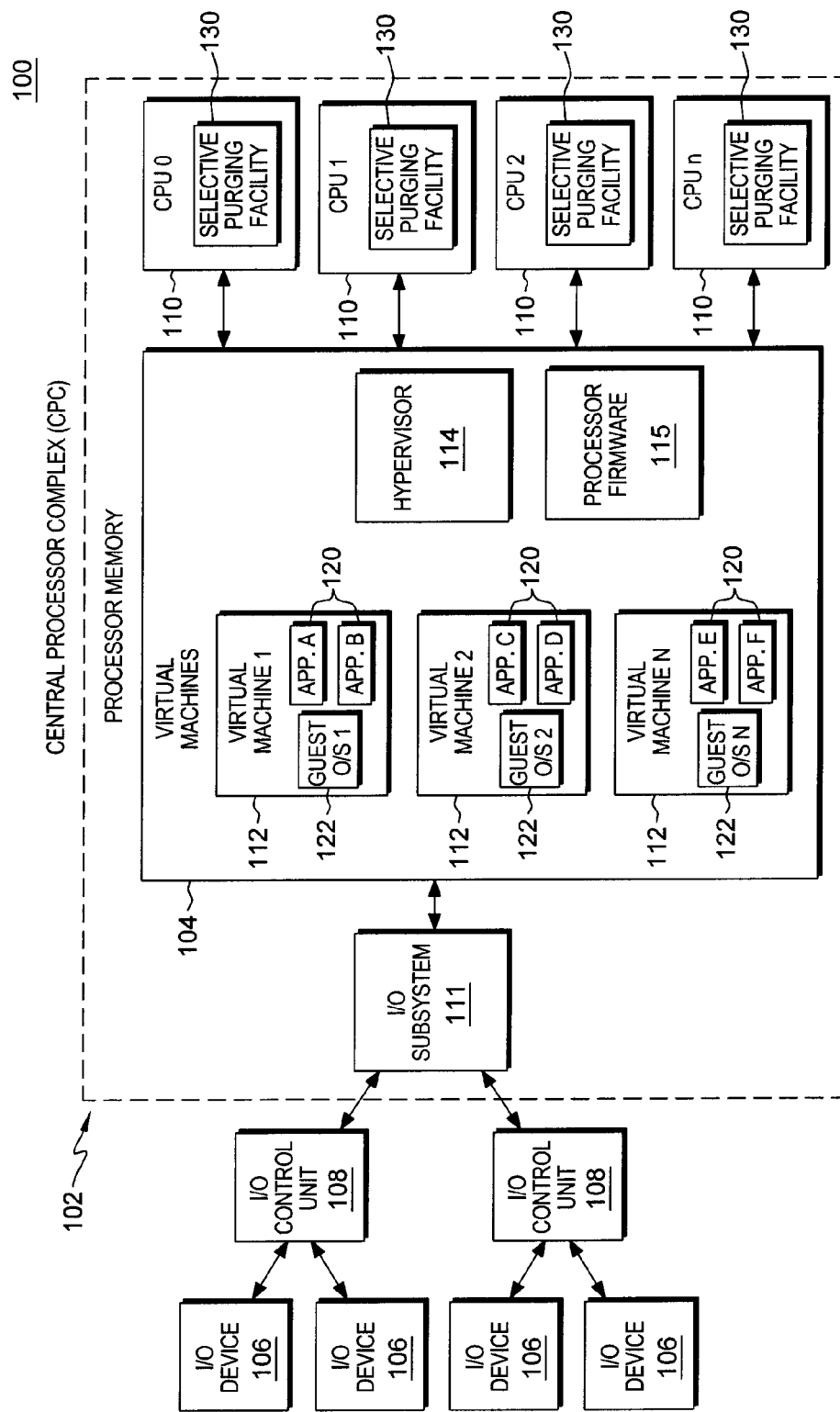
FIG. 1 depicts one example of a virtual computing environment to incorporate and use one or more aspects of a selective purging facility, in accordance with an aspect of the present invention.

One example of a computing environment to incorporate and use one or more aspects of a selective purging facility is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture-Principles of Operation," Publication No. SA22-7832-10, 11$^{th}$ Edition, March 2015, which is hereby incorporated by reference herein in its entirety. Z/ARCHITECTURE, IBM, Z/VM and Z/OS (referenced herein) are registered trademarks of International Business Machines Corporation, Armonk, N.Y. Other names used herein may be registered trademarks, trademarks or product names of International Business Machines Corporation or other companies.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

Computing environment 100 includes a central processor complex (CPC) 102 providing virtual machine support. CPC 102 is coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more virtual machines 112, a virtual machine manager, such as a hypervisor 114, that manages the virtual machines, and processor firmware 115. One example of hypervisor 114 is z/VM®, offered by International Business Machines Corporation, Armonk, N.Y. The hypervisor is sometimes referred to as the host. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the CPC provides the ability to operate large numbers of virtual machines 112, each capable of operating with different programs 120 and running a guest operating system 122, such as Linux. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 104 is coupled to central processors (CPUs) 110, which are physical processor resources assignable to virtual machines. For instance, virtual machine 112 includes one or more logical processors, each of which represents all or a share of a physical processor resource 110 that may be dynamically allocated to the virtual machine. In one embodiment, central processor 110 includes a selective purging facility 130 used, as described herein, to facilitate maintaining the address translation look-aside buffers (TLBs) or other such structures, which include buffering of the guest address translation structure.

Further, processor memory 104 is coupled to an I/O subsystem 111. Input/output subsystem 111 directs the flow of information between input/output control units 108 and devices 106 and main storage 104. It is coupled to the central processing complex, in that it can be a part of the central processing complex or separate therefrom.

In this particular example, the model of virtual machines is a V=V model, in which the real or absolute memory of a virtual machine is backed by host virtual memory, instead of real or absolute memory. Each virtual machine has a contiguous virtual memory space. The physical resources are managed by host 114, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests.

In one embodiment, the host (e.g., z/VM®) and processor (e.g., System z) hardware/firmware interact with each other in a controlled cooperative manner in order to process guest operating system operations without requiring the transfer of control from/to the guest operating system and the host. Guest operations can be executed directly without host intervention via a facility that allows instructions to be interpretively executed for the guest, including a pageable storage mode guest. This facility provides an instruction, Start Interpretive Execution (SIE), which the host can issue, designating a control block called a state description which holds guest (virtual machine) state and controls, such as execution controls and mode controls. The instruction places the machine into an interpretive-execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception.

Figure 2A:
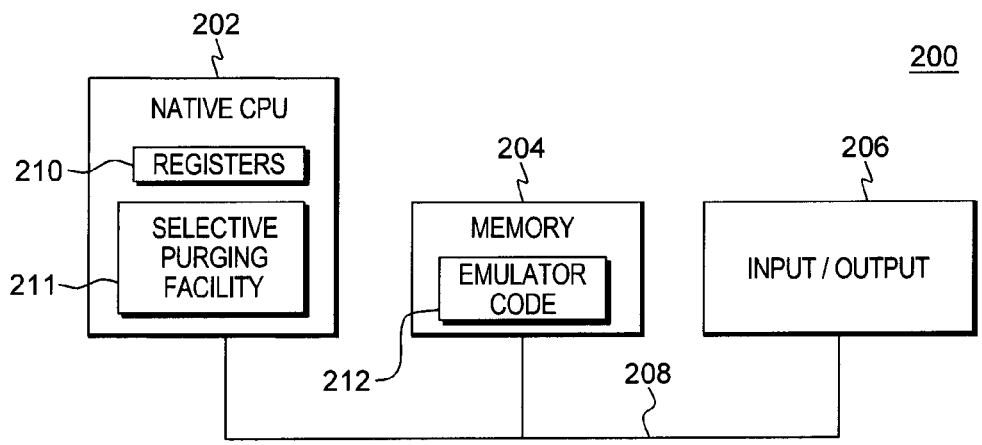
FIG. 2A depicts another example of a computing environment to incorporate and use one or more aspects of a selective purging facility, in accordance with an aspect of the present invention.

Another example of a computing environment to incorporate and use one or more aspects of the selective purging facility is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a z Systems server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment, as well as a selective purging facility 211. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate one or more other architectures. For instance, emulator code 212 allows machines based on architectures other than the z/Architecture, such as PowerPC processors, Power Systems servers, HP Superdome servers or others, to emulate the z/Architecture and to execute software and instructions developed based on the z/Architecture.

Figure 2B:
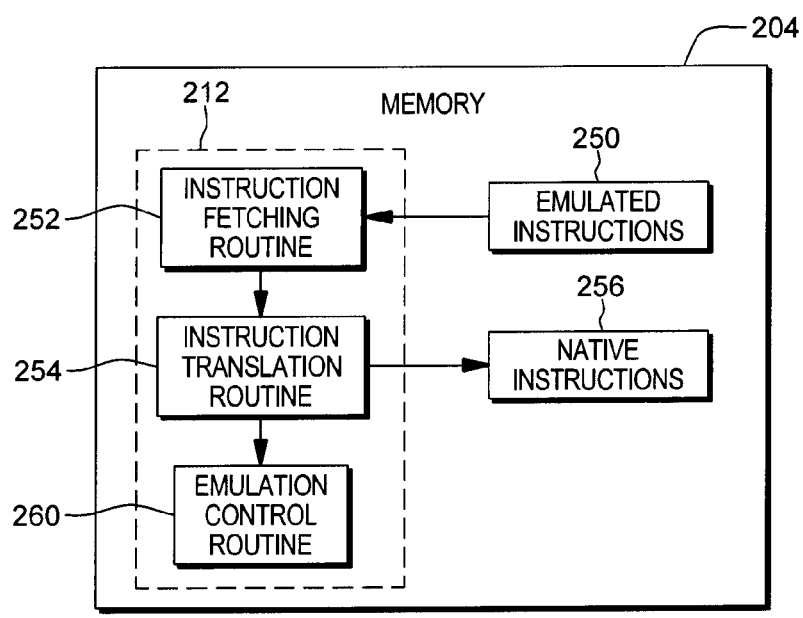
FIG. 2B depicts further details of the memory of FIG. 2A.

Further details relating to emulator code 212 are described with reference to FIG. 2B. Emulated instructions 250 stored in memory 204 comprise software instructions (e.g., correlating to machine instructions) that were developed to be executed in an architecture other than that of native CPU 202. For example, emulated instructions 250 may have been designed to execute on a z/Architecture processor, but instead, are being emulated on native CPU 202, which may be, for example, an Intel Itanium II processor. In one example, emulator code 212 includes an instruction fetching routine 252 to obtain one or more emulated instructions 250 from memory 204, and to optionally provide local buffering for the instructions obtained. It also includes an instruction translation routine 254 to determine the type of emulated instruction that has been obtained and to translate the emulated instruction into one or more corresponding native instructions 256. This translation includes, for instance, identifying the function to be performed by the emulated instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, emulated instructions 250, native instructions 256 and emulator code 212 may reside in the same memory or may be disbursed among different memory devices.

The computing environments described herein support architectural functions, such as dynamic address translation (DAT). With appropriate support by an operating system, the dynamic address translation facility may be used to provide to a user a system in which storage appears to be larger than the main storage which is available in the configuration. This apparent main storage is referred to as virtual storage, and the addresses used to designate locations in the virtual storage are referred to as virtual addresses. The virtual storage of a user may far exceed the size of the main storage which is available in the configuration and normally is maintained in auxiliary storage (e.g., storage not directly addressable). The virtual storage is considered to be composed of blocks of addresses, called pages. Only the most recently referred to pages of the virtual storage are assigned to occupy blocks of physical main storage (e.g., random access memory (RAM)). As the user refers to pages of virtual storage that do not appear in main storage, they are brought in to replace pages in main storage that are less likely to be needed. The swapping of pages of storage may be performed by the operating system without the user's knowledge.

Moreover, in virtual computing environments, the interpretative execution architecture provides a storage mode for absolute storage referred to as a pageable storage mode. In pageable storage mode, dynamic address translation at the host level is used to map guest main storage. The host has the ability to scatter the real storage of pageable storage mode guests to usable frames anywhere in host real storage by using the host DAT, and to page guest data out to auxiliary storage. This technique provides flexibility when allocating real machine resources while preserving the expected appearance of a contiguous range of absolute storage for the guest.

A virtual machine environment may call for application of DAT multiple times: first at the guest level, to translate a guest virtual address through guest managed translation tables into a guest real address, and then, for a pageable guest, at the host level, to translate the corresponding host virtual address to a host real address.

A sequence of virtual addresses associated with virtual storage is called an address space, and the dynamic address translation facility may be used to provide a number of address spaces. These address spaces may be used to provide degrees of isolation between users. Such support can include a completely different address space for each user, thus providing complete isolation, or a shared area may be provided by mapping a portion of each address space to a single common storage area. Also instructions are provided which permit a semi-privileged program to access more than one such address space. Dynamic address translation provides for the translation of, for instance, virtual addresses from multiple different address spaces without requiring that the translation parameters in the control registers be changed.

Dynamic address translation is the process of translating a virtual address during a storage reference into the corresponding real or absolute address. Dynamic address translation may be specified for instruction and data addresses generated by the CPU. The real or absolute address that is formed by dynamic address translation, and the absolute address that is then formed by prefixing, in one embodiment, are 64 bits in length. The virtual address may be a primary virtual address, a secondary virtual address, an AR (Access Register)-specified virtual address, or a home virtual address. The addresses are translated by means of the primary, the secondary, an AR-specified, or the home address space control element (ASCE), respectively. After selection of the appropriate address space control element, the translation process is the same for all of the four types of virtual addresses. An address space control element may be a segment table designation or a region table designation. A segment table designation or region table designation causes translation to be performed by means of tables established by the operating system in real or absolute storage.

In the process of translation when using a segment table designation or a region table designation, three types of units of information are recognized—regions, segments, and pages. The virtual address, accordingly, is divided into four fields. In one example, bits 0-32 are called the region index (RX), bits 33-43 are called the segment index (SX), bits 44-51 are called the page index (PX), and bits 52-63 are called the byte index (BX). The RX part of a virtual address is itself divided into three fields. Bits 0-10 are called the region first index (RFX), bits 11-21 are called the region second index (RSX), and bits 22-32 are called the region third index (RTX), in one embodiment.

Figure 3A:
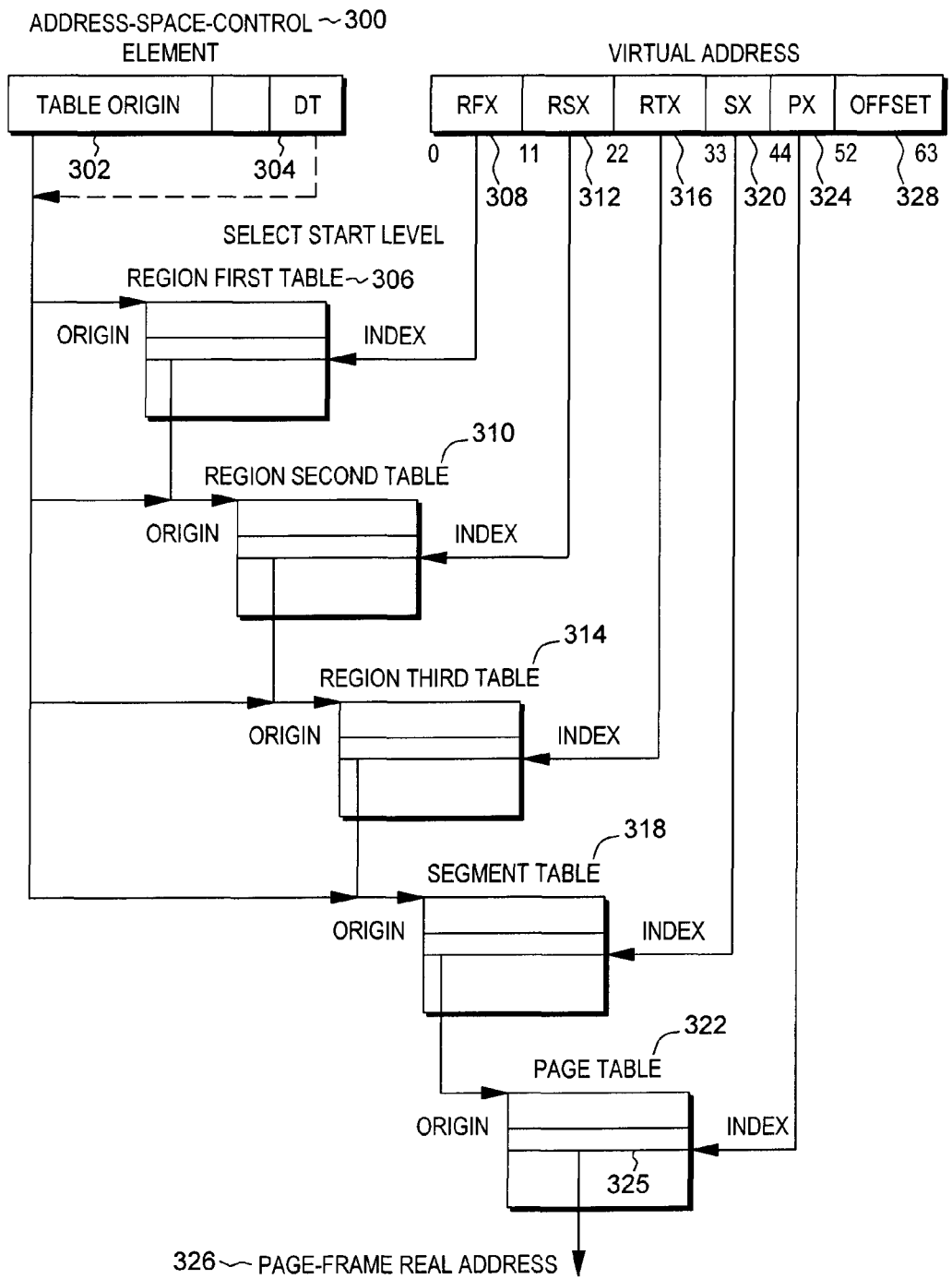
FIG. 3A depicts one example of address translation.

One example of translating a virtual address to a real address is described with reference to FIG. 3A. This process is referred to herein as a DAT walk (or a page walk) in which the address translation tables are walked to translate one address (e.g., a virtual address) to another address (e.g., a real address). In this example, an address space control element (ASCE) 300 includes a table origin 302, as well as a designation type (DT) control 304, which is an indication of a start level for translation (i.e., an indication at which level in the hierarchy address translation is to begin). Using table origin 302 and DT 304, the origin of a particular table is located. Then, based on the table, bits of the virtual address are used to index into the specific table to obtain the origin of the next level table. For instance, if the region first table (RFT) 306 is selected, then bits 0-10 (RFX) 308 of the virtual address are used to index into the region first table to obtain an origin of a region second table (RST) 310. Then, bits 11-21 (RSX) 312 of the virtual address are used to index into region second table 310 to obtain an origin of a region third table (RTT) 314. Similarly, bits 22-32 (RTX) 316 of the virtual address are used to index into region third table 314 to obtain an origin of a segment table 318. Then, bits 33-43 (SX) 320 of the virtual address are used to index into segment table 318 to obtain an origin of page table 322, and bits 44-51 (PX) 324 of the virtual address are used to index into page table 322 to obtain a page table entry (PTE) 325 having a page frame real address (PFRA) 326. The page frame real address is then combined (e.g., concatenated) with offset 328 (bits 52-63) to obtain a real address. Prefixing may then be applied to obtain the corresponding absolute address.

Figure 3B:
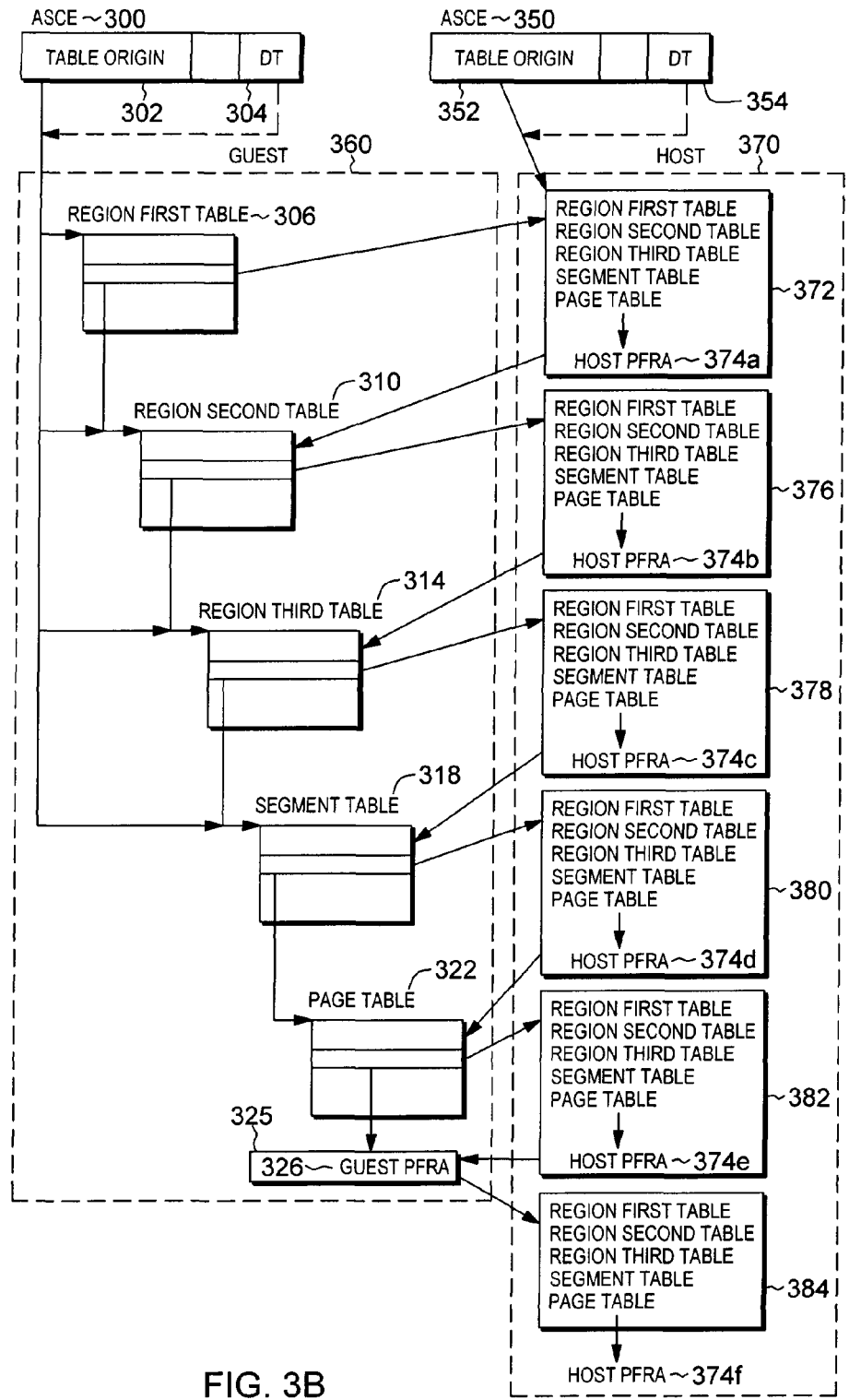
FIG. 3B depicts another example of address translation.

Another example of address translation is described with reference to FIG. 3B. In this example, a DAT walk is performed to translate an initial guest virtual address to a final host real address. In this example, address space control element (ASCE) 300 is a guest address space control element, and DT 304 indicates that guest translation determined by guest address translation structures 360 is to start at region first table 306 pointed to by table origin 302. Thus, the appropriate bits of the initial guest virtual address (e.g., RFX 308) are used to index into region first table 306 to obtain a pointer of an entry of the region first table. The address of the region first table entry (RFTE) is a guest real or absolute address. This guest real or absolute address, with a main storage origin and limit applied, when appropriate, corresponds to a host virtual address. This intermediate host virtual address is then translated using host address translation structures 370. In particular, address space control element (ASCE) 350 is a host address space control element used to indicate a start level for translation in host address translation structures 372. Based on the start level (e.g., region first table) indicated by DT 354, the particular bits of the host virtual address are used to index into the indicated table with table origin 352 to be used for translation using host address translation structure 372, as described with reference to FIG. 3A. The translation of the host virtual address corresponding to the guest RFTE continues until a host page frame real address (PFRA) 374*a* is obtained.

Data at the intermediate host page frame real address is a pointer to the next level of guest address translation structures (e.g., guest region second table 310, in this particular example), and translation continues, as described above. Specifically, host address translation structures 376, 378, 380 and 382 are used to translate the intermediate host virtual addresses associated with the guest region second table 310, region third table 314, segment table 318 and page table 322, respectively, resulting in host PFRAs 374*b*, 374*c*, 374*d* and 374*e*, respectively. Host page frame real address 374*e* includes the address of a guest page table entry 325. Guest page table entry 325 includes a guest page frame real address 326, which is concatenated with the offset from the initial guest virtual address to obtain the corresponding guest absolute address. In some cases, the main storage origin and limit are then applied to calculate the corresponding host virtual address, which is then translated, as described above, using address translation structures 384 to obtain host page frame real address 374*f*. The host page frame real address is then combined (e.g., concatenated) with the offset (e.g., bits 52-63) of the host virtual address to obtain the final host real address. This completes translation of a guest virtual address to a host real address.

Although, in the above examples, translation starts at the region first table, this is only one example. Translation may start at any level for either the guest or the host.

In one embodiment, to improve address translation, the virtual address to real or absolute address translation mapping is stored in an entry of a translation look-aside buffer (TLB). The TLB is a cache used by the memory management hardware to improve virtual address translation speed. The next time translation for a virtual address is requested, the TLB will be checked and if it is in the TLB, there is a TLB hit and the real or absolute address is retrieved therefrom. Otherwise, a page walk is performed, as described above.

As indicated, guest translations may be included in the TLB. These entries may be composite guest/host entries which implicitly include one or more host translations. For example, a guest virtual TLB entry may buffer the entire translation from the initial guest virtual address down to the final host real or absolute address. In this case, the guest TLB entry implicitly includes all intermediate host translations 372, 376, 378, 380 and 382, as well as the final host translation 384, as described in FIG. 3B above. In another example, a hierarchical TLB may contain an entry in a first level of the TLB which buffers a translation from the initial guest virtual address down to the associated origin of the guest page table 322 and a separate entry from a second level of the TLB which buffers the translation from the guest page table entry address down to the final host real or absolute address. In this example, guest entries in the first level of the TLB implicitly include intermediate host translations 372, 376, 378 and 380 which correspond to the host translations which back guest region and segment tables, and guest entries in the second level implicitly include intermediate host translation 382 which backs the guest page table and final host translation 384, as described in FIG. 3B. Many implementations of a translation look-aside buffer are possible.

As described herein, a translation look-aside buffer is provided to enhance performance with address translation; however, the management of the TLB may impact performance. This is particularly true in virtualization environments.

In one example of a virtualization environment, a virtual machine manager dispatches virtual central processing units, also referred to herein as vCPUs or virtual processors, on physical central processing units, also referred to herein as pCPUs or physical processors. Each physical CPU is assigned a unique real CPU address. In this dispatching, typically, the virtual machine manager, e.g., using the SIE instruction, attempts to dispatch the virtual processor on the same physical processor in which that virtual processor last ran. One reason for this is, if the last time the central processing unit of the virtual machine was run on a different physical central processing unit, then the translation look-aside buffer (TLB) of the new current physical central processing unit is to be purged of all its entries associated with the virtual central processing unit. This purge is performed since it is unknown if the virtual central processing unit issued a local purging TLB operation while being executed on the other physical central processing unit.

On each dispatch (e.g., SIE entry) of a virtual processor on a physical processor, the current real central processing unit address (CRCPUA) from the machine is compared to the last real central processing unit address (LRCPUA) on which the virtual processor ran. If a mismatch (referred to herein as an RCPUA mismatch) is detected, the TLB on this physical processor is purged of all entries for this guest virtual processor. This purge is performed since the guest operating system manages the TLB on a virtual CPU basis while the machine manages the TLB on a physical CPU basis and it is unknown if the virtual central processing unit issued a local TLB purging operation while being dispatched on the other physical central processing unit. The result of this purge is that once the guest is running, the first memory reference of each page will incur the overhead of a TLB miss, thereby degrading system performance.

Due to the performance penalty for moving between physical processors, the software threshold for moving previously dispatched work to another physical processor is quite high. This may lead to very long queues of work waiting to be run on a single physical processor while other physical processors may be idle.

Therefore, in accordance with one or more aspects, during dispatch, the amount of TLB purging that is performed when running the central processing unit of a virtual machine on a physical central processing unit (i.e., a host CPU) may be limited in order to improve performance. In one or more aspects, TLB purging on the physical processor is selectively performed based on tracking which physical processors, or subset of physical processors, are to be purged at next dispatch in order to account for a local TLB purging operation that was executed on a different physical processor.

As an example, the virtual CPU tracks—e.g., by setting an indicator per physical processor in the state description—when a local TLB purging operation is performed on another physical processor. When any given guest virtual processor is being dispatched by the host, the physical TLB will not be purged due to an RCPUA mismatch unless the indicator corresponding to this physical processor indicates that a local TLB purging operation has been performed while this virtual processor was running on another physical processor.

In another embodiment, the tracking is limited to tracking the local purging operation on subsets of the physical processors. This would limit the number of indicators that would have to be maintained in the state description. In accordance with this aspect of the present invention, the CRCPUA/LRCPUA compare is revised, and instead of comparing the entire addresses, particular fields of the addresses are compared.

Figure 4:
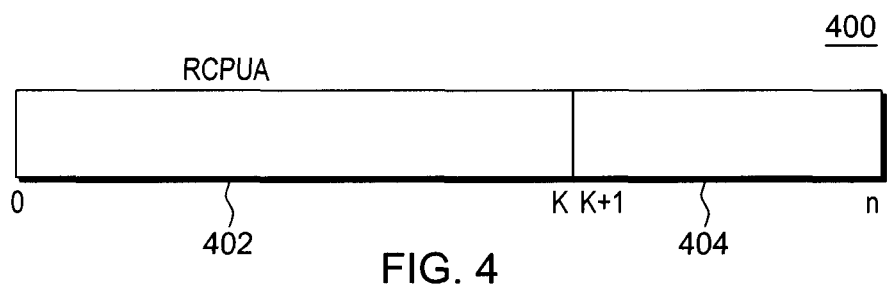
FIG. 4 depicts one example of a format of a real central processing unit (CPU) address (RCPUA), in accordance with an aspect of the present invention.

For example, with reference to FIG. 4, a real central processing unit address (RCPUA) 400 includes a plurality of portions, such as a first portion (e.g., bits 0 to k, where 0≤k<n) 402, and a second portion (e.g., bits k+1 to n) 404. This is the same format whether the RCPUA is the current RCPUA (CRCPUA) or the last RCPUA (LRCPUA). On each guest dispatch by the host (e.g., SIE Entry) of the guest virtual CPU, a value of the first portion 402 of the LRCPUA is compared to a value of the first portion 402 of the CRCPUA. If they are not equal, then the machine purges the TLB on this physical processor of all entries associated with this guest virtual CPU. However, if the values match, then, in accordance with an aspect of the present invention, the physical CPUs that have performed a local purge on dispatch by the host are tracked, and the current physical processor on which the guest virtual processor is running will refrain from purging, unless the indicator indicates it is to purge.

Figure 5:
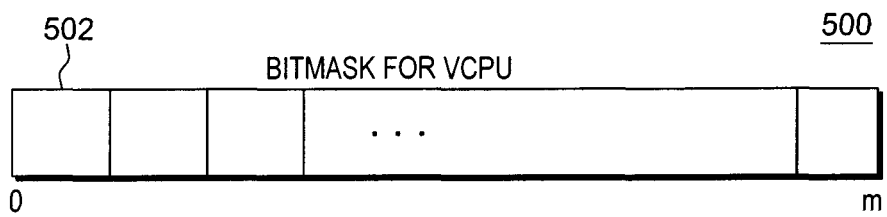
FIG. 5 depicts one example of a bitmask used in accordance with an aspect of the present invention.

As one example, the tracking is performed using a structure, such as a bitmask (e.g., located in the state description), for each virtual processor. As shown in FIG. 5, a bitmask 500 includes a plurality of indicators (e.g., bits) 502 for a plurality of processors. In one example, there is an indicator 502 for each processor on which the virtual processor may run. Further, the current real CPU address is used to index into the bitmask to determine the value of the particular indicator at that location to determine whether a local purge is to be performed on the current physical processor.

In a further example, to limit the size of the bitmask, there is an indicator for each processor of a subset of the plurality of processors. For instance, the size of the bitmask is $2^{(n-k+1)}$ which is the number of processors in a subset, and there are $2^k$ subsets. Tracking is performed, e.g., on one subset at a time or multiple subsets concurrently. In this example, a portion of the current real CPU address is used to index into the bitmask to determine whether a local purge is to be performed on the current physical processor.

For instance, the value of the second portion 404 is used to index into the bitmask to determine whether the current physical processor is to purge on dispatch. If the indicator for the current physical processor is set to a particular value, e.g., zero, then a local purge is not to be performed on dispatch of this virtual guest on this physical processor, and thus, the physical processor may refrain from performing purging for this guest on guest dispatch. In contrast, if the indicator is set to another value, e.g., one, then a local purge is to be performed.

Based on a local purging operation being performed for the vCPU, including a purge during guest dispatch based on a mismatch of the values of the first portion 402, the bitmask is set to a predefined value, such as all ones, except for the bit corresponding to the index of the pCPU that performed the purge. If the values of the first portion 402 match, the value of the second portion 404 is used to index into the bitmask. If the bit in the bitmask is, e.g., one, then a purge is performed as part of the dispatch of the vCPU and the mask bit (i) is set to, e.g., zero. If the bit is, e.g., zero, no purge is to be performed and processing completes.

Figure 6A:
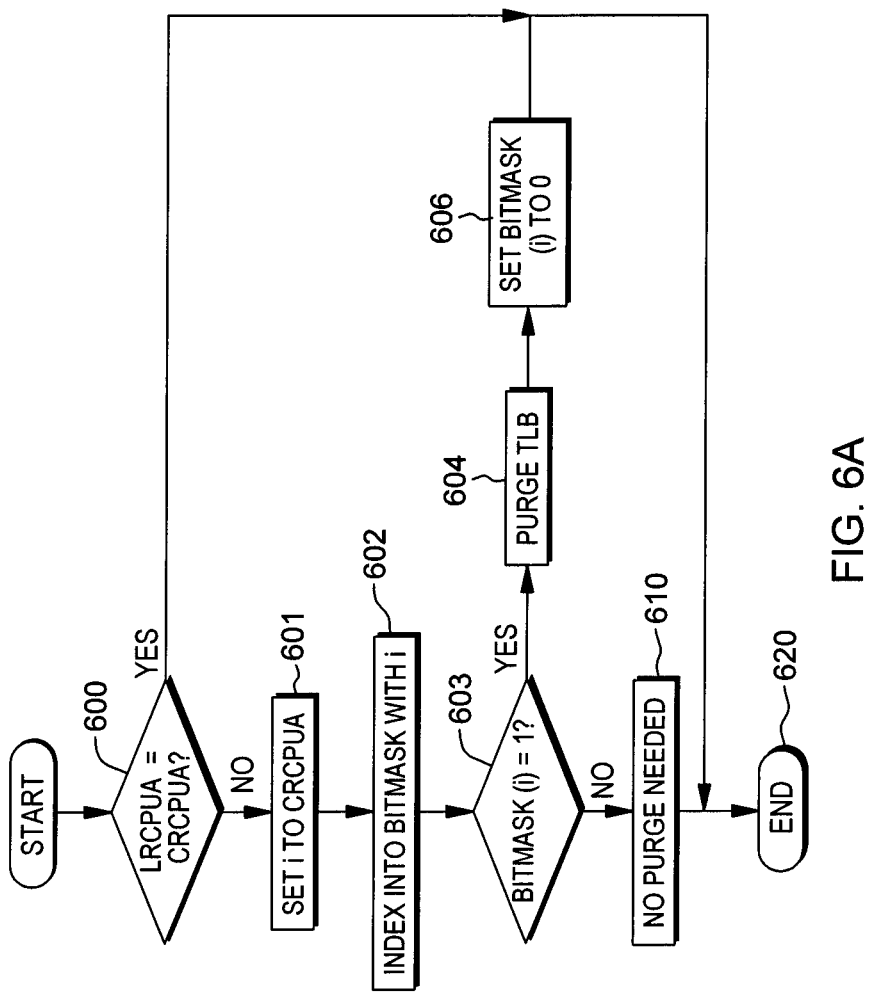
FIG. 6A depicts one example of logic to perform purge processing of a translation look-aside buffer (TLB), in accordance with an aspect of the present invention.
Figure 6B:
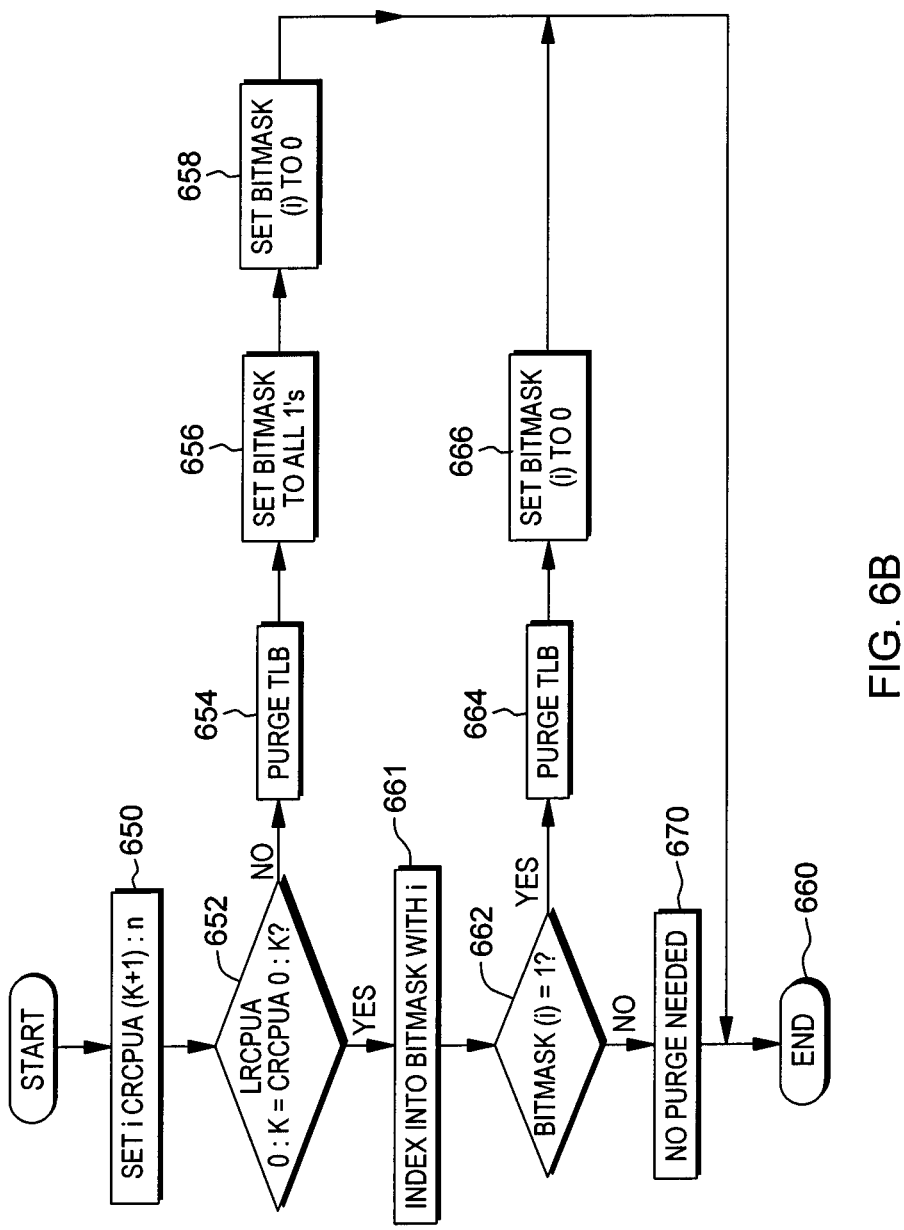
FIG. 6B depicts another example of logic to perform purge processing of a translation look-aside buffer (TLB), in accordance with an aspect of the present invention.
Figure 7:
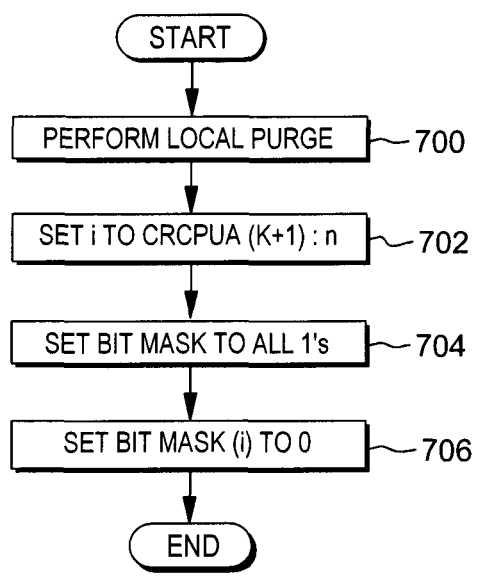
FIG. 7 depicts one example of logic to perform local purge processing for a translation look-aside buffer, in accordance with one or more aspects of the present invention.

Further details of this purge processing are described with reference to FIGS. 6A-7. FIG. 6A depicts one embodiment of a guest TLB purge process during dispatch by the host; FIG. 6B depicts another embodiment of a guest TLB purge process during dispatch by the host; and FIG. 7 depicts one embodiment of a local guest TLB purging process.

Referring to FIG. 6A, based on, for instance, a host starting up a guest (e.g., a vCPU having a particular identifier, vCPU ID) on a physical processor (e.g., a pCPU), TLB purge processing may be performed. As part of this purge processing, initially, a determination is made as to whether the LRCPUA is equal to the CRCPUA, INQUIRY 600. If they are equal, then processing is complete, STEP 620. Otherwise, purge processing continues.

For instance, in one example, if the LRCPUA is not equal to the CRCPUA, INQUIRY 600, then a variable i is set to CRCPUA, STEP 601. The value of i is used to index into the bitmask, STEP 602. A determination is made as to whether the bit at bitmask (i) is equal to, e.g., one, INQUIRY 603. If it is equal to one, then the TLB on this physical processor is purged of entries belonging to this guest vCPU, STEP 604. For instance, all entries in the TLB for this vCPU_ID (i.e., this guest) are purged (e.g., cleared). Further, bitmask (i) is set equal to, e.g., zero, STEP 606. Processing then completes, STEP 620.

Returning to INQUIRY 603, if the bit at bitmask (i) is not equal to, e.g., one, then no purge is needed, STEP 610, and processing of a TLB purge for this guest vCPU on this pCPU is complete, STEP 620. This reduces the amount of purge processing to be performed, e.g., when a virtual processor is moved from one physical processor to another physical processor.

Referring to FIG. 6B, based on, for instance, a host starting up a guest on a physical processor, TLB purge processing may be performed. As part of this purge processing, initially, a variable i is set to the value of selected bits (e.g., (k+1):n of the current RCPUA (i.e., CRCPUA (k+1):n), see FIG. 4), STEP 650. A determination is made as to whether a value of the first portion of the last RCPUA (e.g., LRCPUA (e.g., 0:k)) is equal to a value of the first portion of the current RCPUA (e.g., CRCPUA (e.g., 0:k)), INQUIRY 652. If they are not equal, then the TLB on this physical processor is purged of any entries corresponding to this virtual guest CPU (i.e., this vCPU_ID), STEP 654. Further, the bitmask is set to all ones, STEP 656, and bitmask (i) is set to zero, STEP 658, to indicate that this physical processor performed the purge. (In a further embodiment, all of the bits of the bitmask, except for i are set to one, and i is set to zero. Other implementations are possible.) Processing is then complete, STEP 660.

Returning to INQUIRY 652, if the value of the first portion of LRCPUA is equal to the value of the first portion of CRCPUA, then i is used to index into the bitmask, STEP 661. A determination is made as to whether the bit at bitmask (i) is equal to, e.g., one, INQUIRY 662. If it is equal to one, then the TLB on this physical processor is purged of entries belonging to this guest vCPU, STEP 664, and bitmask (i) is set equal to, e.g., zero, STEP 666. Processing then completes, STEP 660.

Returning to INQUIRY 662, if the bit at bitmask (i) is not equal to, e.g., one, then no purge is needed, STEP 670, and processing of a TLB purge for this guest vCPU on this pCPU is complete, STEP 660. This reduces the amount of purge processing to be performed, e.g., when a virtual processor is moved from one physical processor to another physical processor.

In one aspect, a guest may perform a local purge operation. One embodiment of this processing is described with reference to FIG. 7. Initially, a purge of the local TLB on the virtual processor is performed, STEP 700. That is, one or more guest entries in the TLB for this guest (e.g., vCPU_ID) are cleared. Further, in one example, i is set to a value of CRCPUA (k+1):n, STEP 702. Additionally, the bitmask is set to all ones, STEP 704, and bitmask (i) is set to, e.g., zero indicating a purge for this guest processor has been performed on this physical processor, STEP 706. (Again, in a further embodiment, all of the bits of the bitmask, except for i are set to one, and i is set to zero. Other implementations are possible.)

In one embodiment, STEPS 702-706 may be performed once based on the guest returning to the host, instead of on each local purge if they happen in bursts.

Figure 8A:
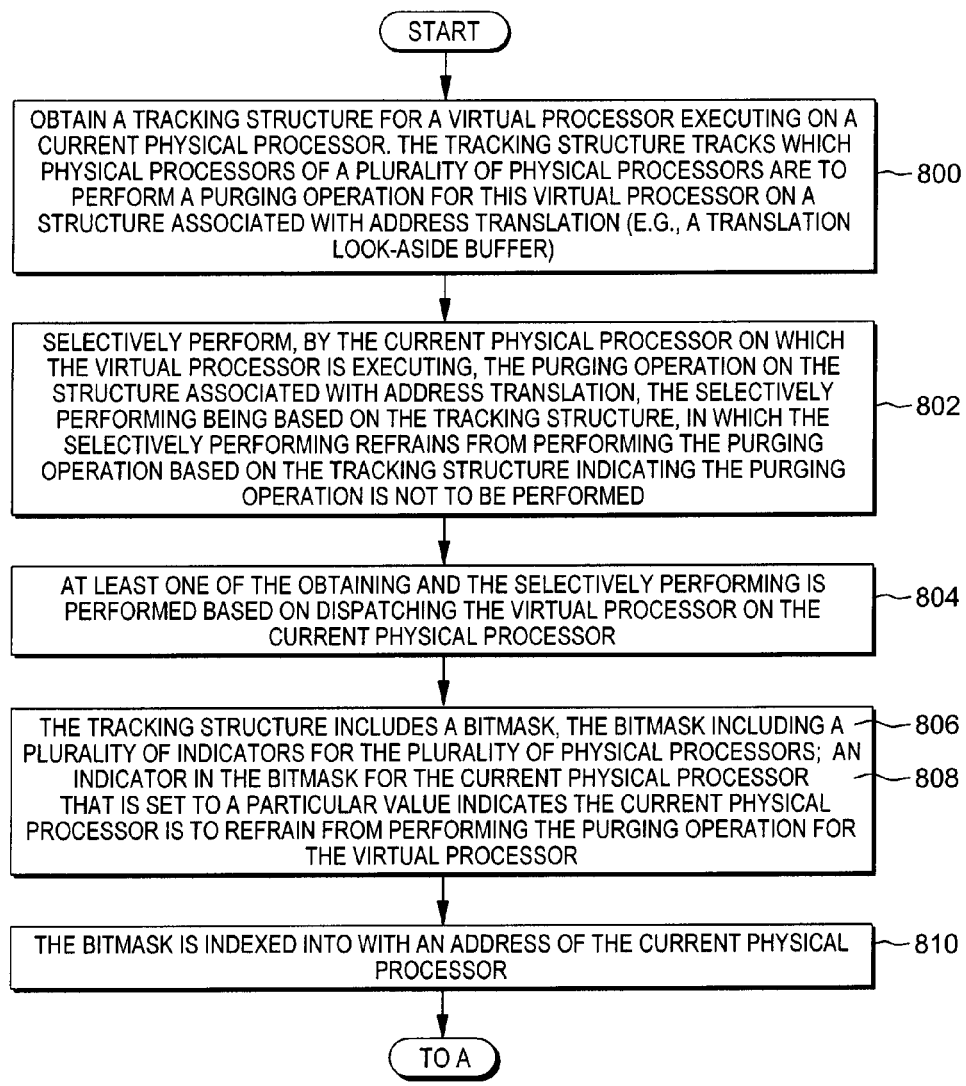
FIGS. 8A-8C depict one embodiment of selective purging logic, in accordance with an aspect of the present invention.

Further aspects of the selective purging are described with reference to FIGS. 8A-8C. Referring to FIG. 8A, in one embodiment, a tracking structure for a virtual processor executing on a current physical processor is obtained, STEP 800. The tracking structure tracks which physical processors of a plurality of physical processors are to perform a purging operation for this virtual processor on a structure associated with address translation (e.g., a translation look-aside buffer).

The current physical processor on which the virtual processor is executing selectively performs the purging operation on the structure associated with address translation, STEP 802. The selectively performing is based on the tracking structure, and the selectively performing refrains from performing the purging operation based on the tracking structure indicating the purging operation is not to be performed. This aspect reduces the need to perform the purging operation in certain circumstances, and therefore, may increase system performance.

In one embodiment, at least one of the obtaining and the selectively performing is performed based on dispatching the virtual processor on the current physical processor, STEP 804.

Further, in one embodiment, the tracking structure includes a bitmask, and the bitmask includes a plurality of indicators for the plurality of physical processors, STEP 806. An indicator in the bitmask for the current physical processor that is set to a particular value indicates the current physical processor is to refrain from performing the purging operation for the virtual processor, STEP 808. The use of a bitmask facilitates tracking.

In one example, the bitmask is indexed into with an address of the current physical processor, STEP 810.

Figure 8B:
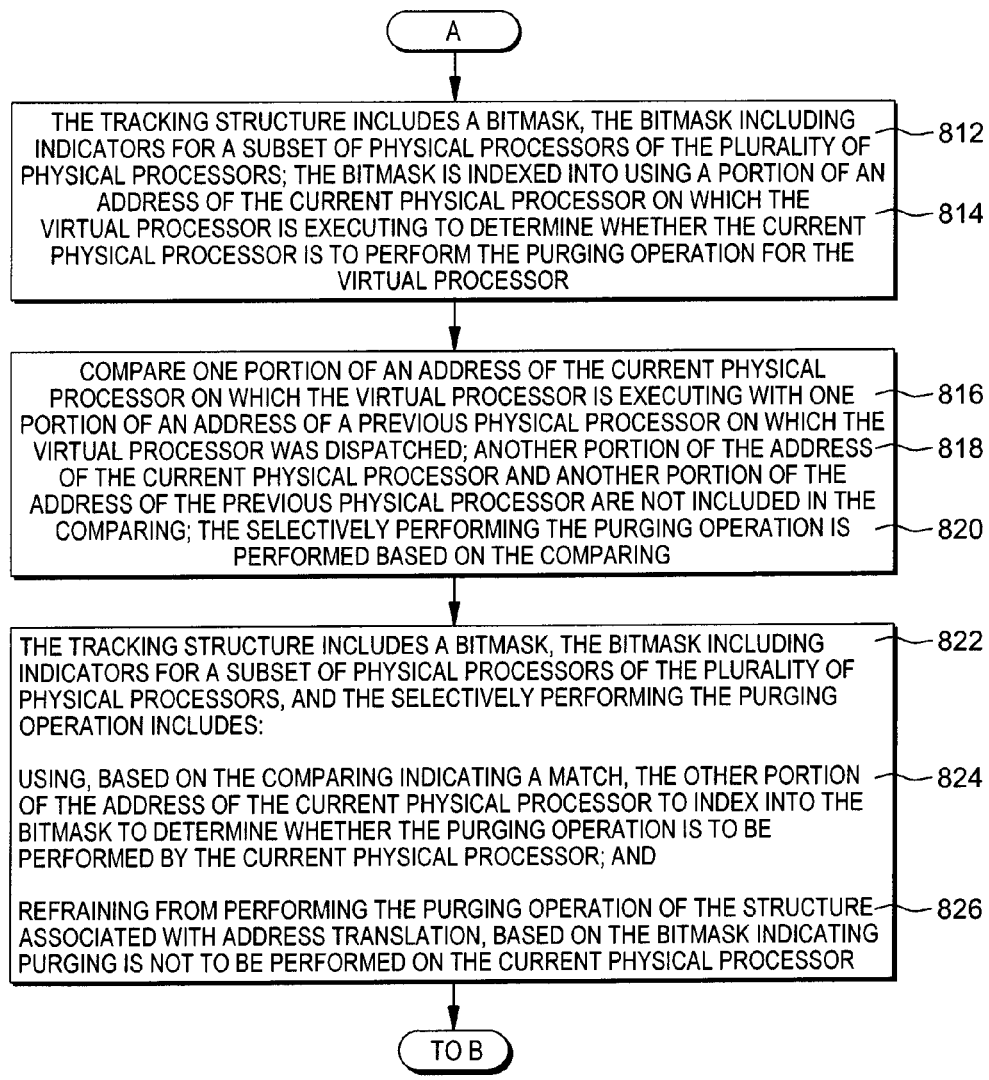

In a further embodiment, the tracking structure includes a bitmask, and the bitmask includes indicators for a subset of physical processors of the plurality of physical processors, STEP 812 (FIG. 8B). In this embodiment, the bitmask is indexed into using a portion of an address of the current physical processor on which the virtual processor is executing to determine whether the current physical processor is to perform the purging operation for the virtual processor, STEP 814. This example of the bitmask only needs to include indicators for a subset of the processors enabling use of a smaller bitmask.

In another aspect, one portion of an address of the current physical processor on which the virtual processor is executing is compared with one portion of an address of a previous physical processor on which the virtual processor was dispatched, STEP 816. Another portion of the address of the current physical processor and another portion of the address of the previous physical processor are not included in the comparing, STEP 818. The selectively performing the purging operation is performed based on the comparing, STEP 820.

In a further aspect, the tracking structure includes a bitmask, and the bitmask includes indicators for a subset of physical processors of the plurality of physical processors, STEP 822. Further, the selectively performing the purging operation includes: using, based on the comparing indicating a match, the other portion of the address of the current physical processor to index into the bitmask to determine whether the purging operation is to be performed by the current physical processor, STEP 824; and refraining from performing the purging operation of the structure associated with address translation, based on the bitmask indicating purging is not to be performed on the current physical processor, STEP 826.

Figure 8C:
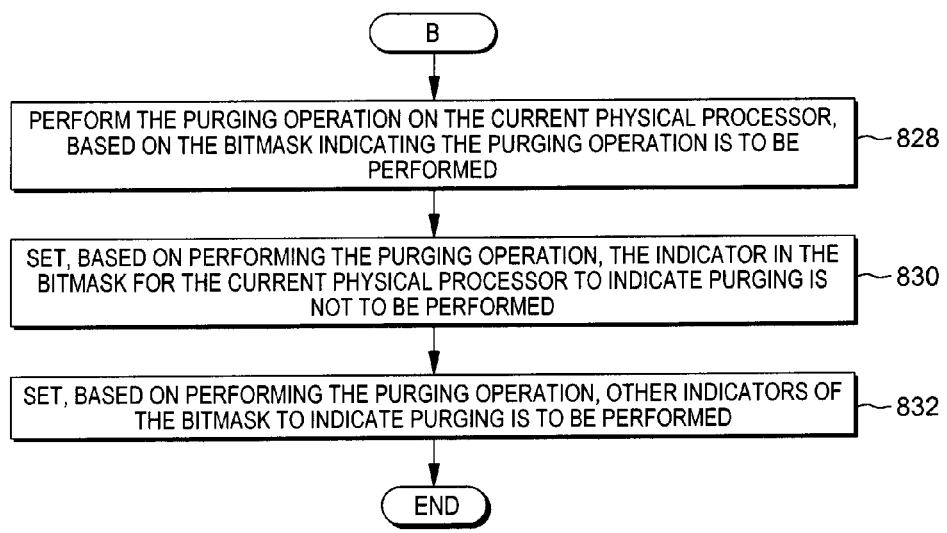

In one embodiment, the purging operation is performed on the current physical processor, based on the bitmask indicating the purging operation is to be performed, STEP 828 (FIG. 8C).

In one embodiment, based on performing the purging operation, the indicator in the bitmask for the current physical processor is set to indicate purging is not to be performed, STEP 830. Moreover, based on performing the purging operation, other indicators of the bitmask are set to indicate purging is to be performed, STEP 832.

The selective purging may reduce the amount of TLB purging, thus, enhancing system performance.

As used herein, main memory and main storage are used interchangeably unless otherwise noted explicitly or implicitly.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 9:
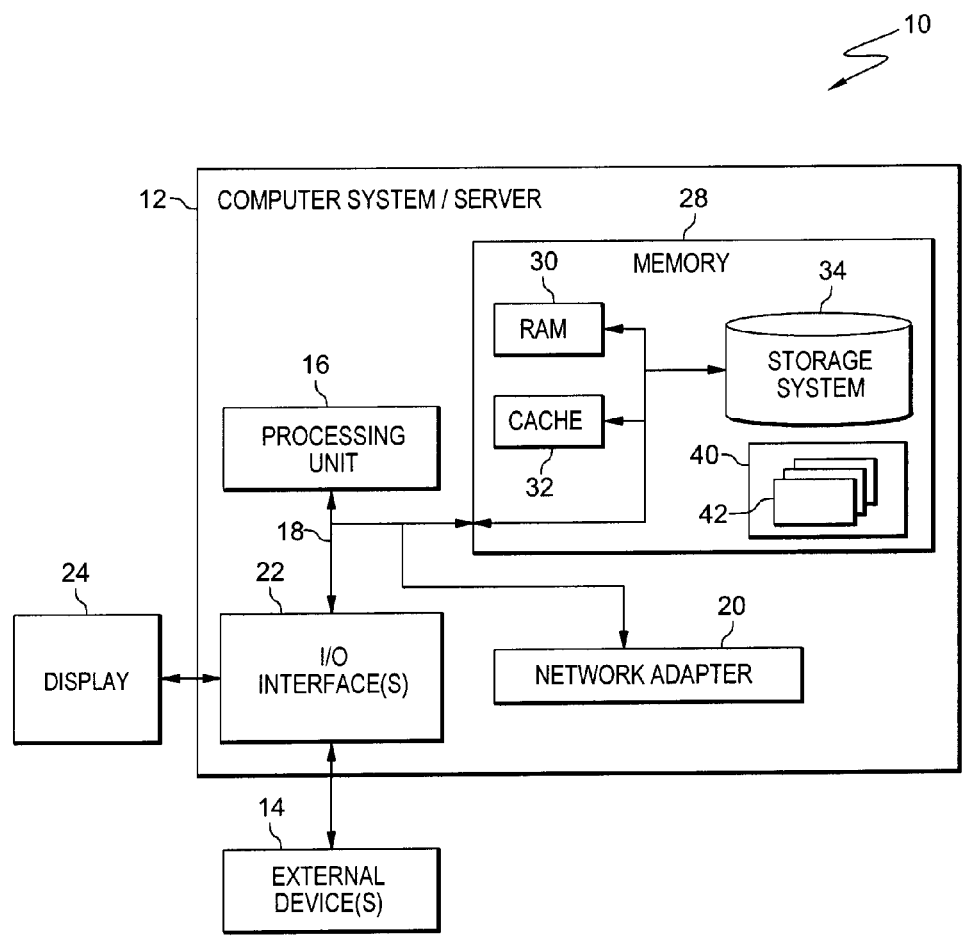
FIG. 9 depicts one embodiment of a cloud computing node.

Referring now to FIG. 9, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 10:
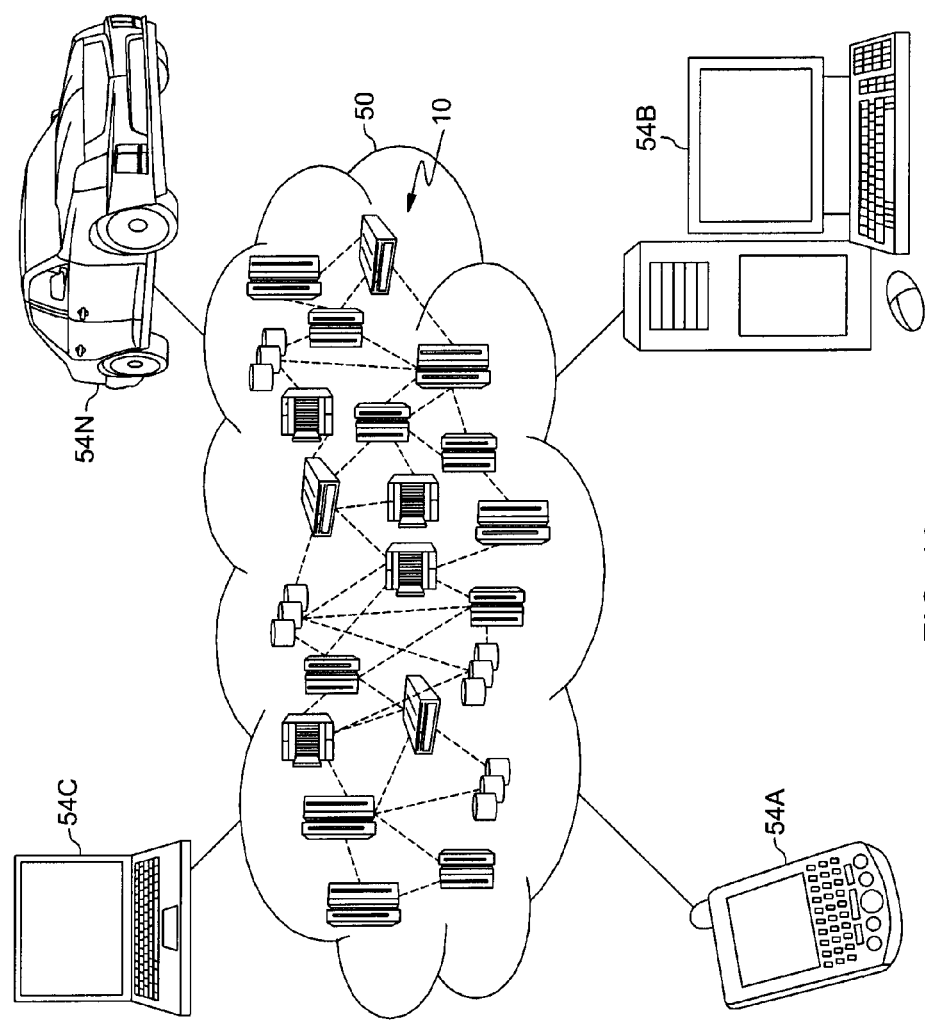
FIG. 10 depicts one embodiment of a cloud computing environment.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
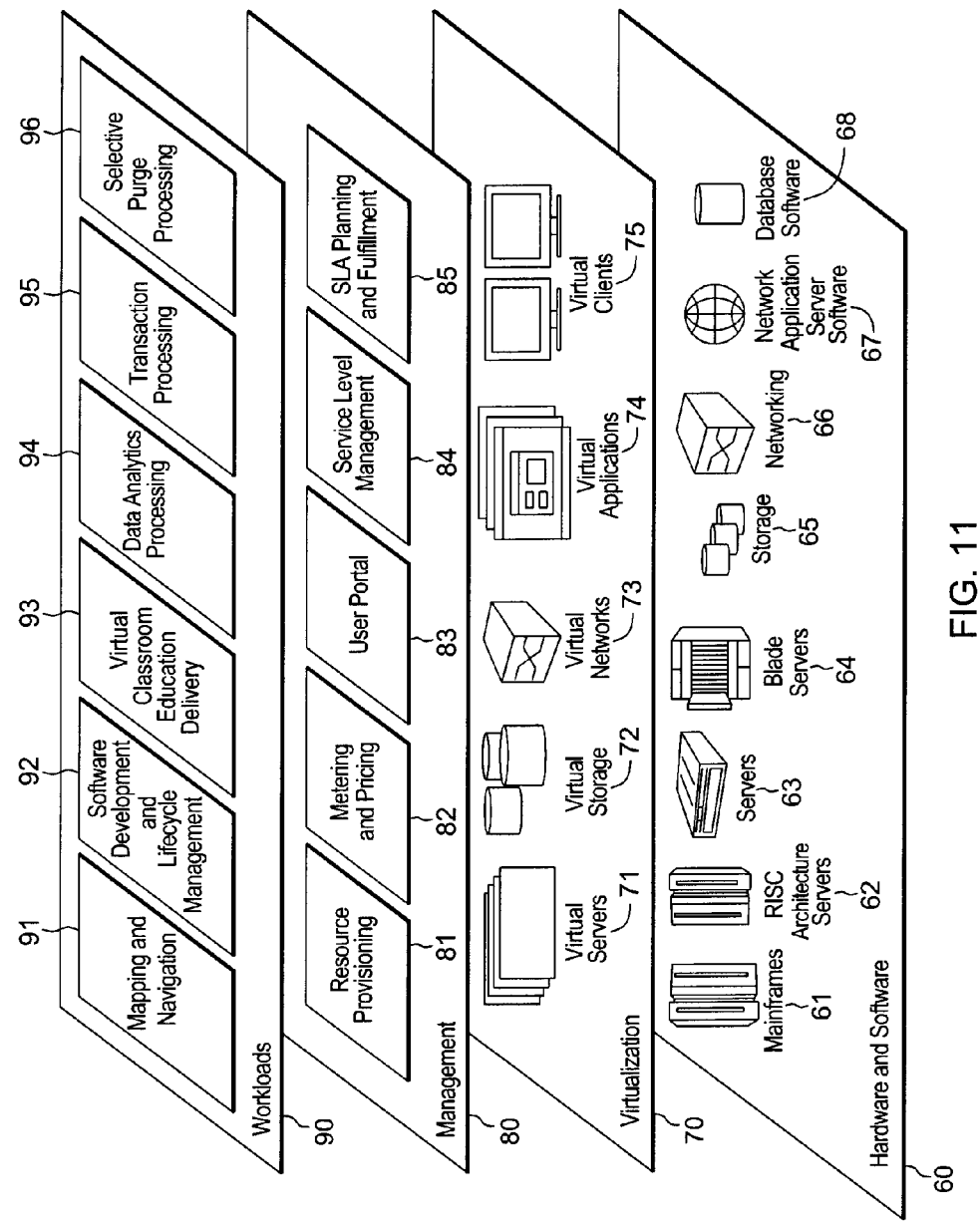
FIG. 11 depicts one example of abstraction model layers.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective purging processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for managing purging of structures associated with address translation, said computer program product comprising:
a computer readable storage medium readable by a processing circuit and storing instructions for execution by the processing circuit for performing a method comprising:
obtaining a tracking structure for a virtual processor executing on a current physical processor, the tracking structure tracking which physical processors of a plurality of physical processors are to perform a purging operation for this virtual processor on a structure associated with address translation; and
selectively performing, by the current physical processor on which the virtual processor is executing, the purging operation on the structure associated with address translation, the selectively performing being based on the tracking structure, wherein the selectively performing refrains from performing the purging operation based on the tracking structure indicating the purging operation is not to be performed.

2. The computer program product of claim 1, wherein at least one of the obtaining and the selectively performing is performed based on dispatching the virtual processor on the current physical processor.

3. The computer program product of claim 1, wherein the tracking structure comprises a bitmask, the bitmask comprising a plurality of indicators for the plurality of physical processors, and wherein an indicator in the bitmask for the current physical processor that is set to a particular value indicates the current physical processor is to refrain from performing the purging operation for the virtual processor.

4. The computer program product of claim 3, wherein the method further comprises indexing into the bitmask with an address of the current physical processor.

5. The computer program product of claim 1, wherein the tracking structure comprises a bitmask, the bitmask comprising indicators for a subset of physical processors of the plurality of physical processors, and wherein the bitmask is indexed into using a portion of an address of the current physical processor on which the virtual processor is executing to determine whether the current physical processor is to perform the purging operation for the virtual processor.

6. The computer program product of claim 1, wherein the method further includes comparing one portion of an address of the current physical processor on which the virtual processor is executing with one portion of an address of a previous physical processor on which the virtual processor was dispatched, wherein another portion of the address of the current physical processor and another portion of the address of the previous physical processor are not included in the comparing, and wherein the selectively performing the purging operation is performed based on the comparing.

7. The computer program product of claim 6, wherein the tracking structure comprises a bitmask, the bitmask comprising indicators for a subset of physical processors of the plurality of physical processors, and wherein the selectively performing the purging operation includes:
using, based on the comparing indicating a match, the other portion of the address of the current physical processor to index into the bitmask to determine whether the purging operation is to be performed by the current physical processor; and
refraining from performing the purging operation of the structure associated with address translation, based on the bitmask indicating purging is not to be performed on the current physical processor.

8. The computer program product of claim 7, wherein the method further comprises:
performing the purging operation on the current physical processor, based on the bitmask indicating the purging operation is to be performed; and
setting, based on performing the purging operation, the indicator in the bitmask for the current physical processor to indicate purging is not to be performed.

9. The computer program product of claim 8, wherein the method further comprises setting, based on performing the purging operation, other indicators of the bitmask to indicate purging is to be performed.

10. The computer program product of claim 1, wherein the structure associated with address translation comprises a translation look-aside buffer.

11. A computer system for managing purging of structures associated with address translation, said computer system comprising:
a memory; and
a processor in communication with the memory, wherein the computer system is configured to perform a method, said method comprising:
obtaining a tracking structure for a virtual processor executing on a current physical processor, the tracking structure tracking which physical processors of a plurality of physical processors are to perform a purging operation for this virtual processor on a structure associated with address translation; and
selectively performing, by the current physical processor on which the virtual processor is executing, the purging operation on the structure associated with address translation, the selectively performing being based on the tracking structure, wherein the selectively performing refrains from performing the purging operation based on the tracking structure indicating the purging operation is not to be performed.

12. The computer system of claim 11, wherein the tracking structure comprises a bitmask, the bitmask comprising a plurality of indicators for the plurality of physical processors, and wherein an indicator in the bitmask for the current physical processor that is set to a particular value indicates the current physical processor is to refrain from performing the purging operation for the virtual processor.

13. The computer system of claim 11, wherein the tracking structure comprises a bitmask, the bitmask comprising indicators for a subset of physical processors of the plurality of physical processors, and wherein the bitmask is indexed into using a portion of an address of the current physical processor on which the virtual processor is executing to determine whether the current physical processor is to perform the purging operation for the virtual processor.

14. The computer system of claim 11, wherein the method further includes comparing one portion of an address of the current physical processor on which the virtual processor is executing with one portion of an address of a previous physical processor on which the virtual processor was dispatched, wherein another portion of the address of the current physical processor and another portion of the address of the previous physical processor are not included in the comparing, and wherein the selectively performing the purging operation is performed based on the comparing.

15. The computer system of claim 14, wherein the tracking structure comprises a bitmask, the bitmask comprising indicators for a subset of physical processors of the plurality of physical processors, and wherein the selectively performing the purging operation includes:
using, based on the comparing indicating a match, the other portion of the address of the current physical processor to index into the bitmask to determine whether the purging operation is to be performed by the current physical processor; and
refraining from performing the purging operation of the structure associated with address translation, based on the bitmask indicating purging is not to be performed on the current physical processor.

16. A computer-implemented method of managing purging of structures associated with address translation, said computer-implemented method comprising:
obtaining a tracking structure for a virtual processor executing on a current physical processor, the tracking structure tracking which physical processors of a plurality of physical processors are to perform a purging operation for this virtual processor on a structure associated with address translation; and
selectively performing, by the current physical processor on which the virtual processor is executing, the purging operation on the structure associated with address translation, the selectively performing being based on the tracking structure, wherein the selectively performing refrains from performing the purging operation based on the tracking structure indicating the purging operation is not to be performed.

17. The computer-implemented method of claim 16, wherein the tracking structure comprises a bitmask, the bitmask comprising a plurality of indicators for the plurality of physical processors, and wherein an indicator in the bitmask for the current physical processor that is set to a particular value indicates the current physical processor is to refrain from performing the purging operation for the virtual processor.

18. The computer-implemented method of claim 16, wherein the tracking structure comprises a bitmask, the bitmask comprising indicators for a subset of physical processors of the plurality of physical processors, and wherein the bitmask is indexed into using a portion of an address of the current physical processor on which the virtual processor is executing to determine whether the current physical processor is to perform the purging operation for the virtual processor.

19. The computer-implemented method of claim 16, further comprising comparing one portion of an address of the current physical processor on which the virtual processor is executing with one portion of an address of a previous physical processor on which the virtual processor was dispatched, wherein another portion of the address of the current physical processor and another portion of the address of the previous physical processor are not included in the comparing, and wherein the selectively performing the purging operation is performed based on the comparing.

20. The computer-implemented method of claim 19, wherein the tracking structure comprises a bitmask, the bitmask comprising indicators for a subset of physical processors of the plurality of physical processors, and wherein the selectively performing the purging operation includes:
using, based on the comparing indicating a match, the other portion of the address of the current physical processor to index into the bitmask to determine whether the purging operation is to be performed by the current physical processor; and
refraining from performing the purging operation of the structure associated with address translation, based on the bitmask indicating purging is not to be performed on the current physical processor.

* * * * *